US006959382B1

(12) United States Patent
Kinnis et al.

(10) Patent No.: US 6,959,382 B1
(45) Date of Patent: Oct. 25, 2005

(54) DIGITAL SIGNATURE SERVICE

(75) Inventors: Tony F. Kinnis, Murray, KY (US); Ho Wing Sit, Moraga, CA (US)

(73) Assignee: Accela, Inc., Dublin, CA (US)

( * ) Notice: Subject to any disclaimer, the term of this patent is extended or adjusted under 35 U.S.C. 154(b) by 0 days.

(21) Appl. No.: 09/375,475

(22) Filed: Aug. 16, 1999

(51) Int. Cl.$^7$ ................................................. H04L 9/32
(52) U.S. Cl. ........................ 713/170; 713/168; 713/176
(58) Field of Search ................................. 713/170, 168, 713/175, 176, 177, 178, 155, 153

(56) References Cited

U.S. PATENT DOCUMENTS

| | | | |
|---|---|---|---|
| 5,208,858 A | | 5/1993 | Vollert et al. |
| 5,825,880 A | * | 10/1998 | Sudia et al. ................. 713/180 |
| 6,209,091 B1 | * | 3/2001 | Sudia et al. ................. 713/175 |
| 6,237,096 B1 | * | 5/2001 | Bisbee et al. ............... 713/178 |
| 6,363,479 B1 | * | 3/2002 | Godfrey et al. ............. 713/160 |

FOREIGN PATENT DOCUMENTS

| | | |
|---|---|---|
| EP | 0 845 733 A2 | 11/1997 |
| EP | 0 940 945 A2 | 9/1999 |
| WO | WO 97/12460 A1 | 4/1997 |
| WO | WO 97/43717 A1 | 11/1997 |
| WO | WO 97/50036 | 12/1997 |
| WO | WO 97/50207 A1 | 12/1997 |
| WO | WO 98/20644 | 5/1998 |
| WO | WO 98/54633 | 12/1998 |
| WO | WO 99/22486 | 5/1999 |
| WO | WO 99/48243 | 9/1999 |
| WO | WO 99/57847 | 11/1999 |
| WO | WO 99/59096 | 11/1999 |

OTHER PUBLICATIONS

Lowry, J.: "Location–Independent Information Object Security,", IEEE Comput. Soc. Press, 1995, pp. 54–62, SP002155116 Los Alamitos, CA, USA.
Kalla, et al: "Achieving non–repudiation of Web based transactions", The Journal of Systems and Software, 1999, pp. 165–175, v. 48.

* cited by examiner

*Primary Examiner*—Matthew Smithers
(74) *Attorney, Agent, or Firm*—Stattler Johansen & Adeli LLP

(57) ABSTRACT

A digital signature service generates digital signatures for documents independent of the program used to transmit the documents. The digital signature service may operate as a Web server application, or as a client application on a user's computer. The digital signature service imports a certificate specific to a user. To digitally sign a document, the user identifies a document, and the digital signature service generates a single signature file that includes the user's certificate, the document, and the digital signature. With the signature file, the user may now store and/or transmit the file using any program while maintaining the integrity and authenticity capabilities associated with digital signatures. The digital signature service also permits multiple digital signatories to a single document. A secure document repository, implemented on a Web Site, is also disclosed.

12 Claims, 10 Drawing Sheets

DIGITAL SIGNATURE SERVICE

BACKGROUND OF THE INVENTION

1. Field of the Invention

The present invention is directed toward the field of electronic commerce ("e-commerce"), and more particularly toward generating an open digital signature for use in e-commerce.

2. Art Background

Electronic commerce, known as "e-commerce", has become increasingly more popular with the proliferation of the Internet. In general, e-commerce involves electronic transactions between two or more parties. For example, an e-commerce transaction may be between a consumer and an on-line merchant, or an e-commerce transaction may be implemented for procurement between a company and its vendor. Regardless of the nature of the transaction, in order to promote the use of e-commerce, there is a demand for secure transactions among the parties. A secure transaction involves both the ability to verify that information, transmitted as part of the transaction, has not been altered, as well as the ability to authenticate the parties themselves. In order to provide secure transactions for use in e-commerce, digital signatures have been used.

In general, a digital signature is an encrypted electronic fingerprint. When the encrypted fingerprint is attached to a file or a document, the digital signature signifies that the owner issued the document. This characteristic of digital signatures enables the conduction of e-commerce to occur in a legal and binding manner. The process of generating a digital signature involves the use of both a certificate, particular to each individual or entity, and a signature, that constitutes a unique fingerprint of the document or file. The fingerprint, referred to as message digest, is derived from data in the document or file being signed. The message digest is encrypted for authentication purposes using the signor's private key so that it may only be decrypted with the signor's public key. The public key is contained in the signor's certificate, and is transmitted to the recipient of the document.

In order to make the message digest legal and binding, a Certification Authority, such as Digital Signature Trust, Verisign, Entrust, and many others, acts as an independent third party, very much like a notary public. In general, the Certificate Authority issues unique certificates to individuals or entities, and, during the process of verification of a digital signature, provides the means to verify and certify that the electronic fingerprint belongs to the certificate holder.

Digital signatures use, as a security mechanism, public key cryptography. In general, with public key cryptography, the signor of a document receives a private key and public key pair. The fingerprint is encrypted with the private key, and the public key is sent to the recipient of the document to decrypt the digital signature. The private key portion of the security key pair is similar to the PIN code of your credit card. Currently, the Certification Authority issues a Certificate, using Industry Standard Organization ("ISO") X.509 standard, that encapsulates the public key portion of the private-public key pair.

Although digital signatures provide a way to authenticate documents, in practice, current software products that generate digital signatures do not permit an effective way to store, retrieve, and manipulate documents in a manner that is useful to users. The following scenario illustrates the inability to effectively use digital signatures. Suppose that John Public had a document containing very sensitive legal information regarding a contractual agreement he wished to make with ACME Company. John does not have the time to come to the ACME office with the document, so he uses his email client to digitally sign and send the document to ACME. The next morning Jane Doe, an employee at ACME, reads her email that contains John's document. She notes that the document is digitally signed and confirms that the document is from John and has not been altered from its original form. However, Jane Doe now must store the document in her database to subsequently obtain proper approval from her supervisor regarding the terms of John Public's contract. Here is where the problems begin to a rise. The approval person at ACME has no way of knowing that the document has not changed since Jane stored it in the company database. This example shows how the usefulness of the digital signature disappears once the document leaves the email client.

Accordingly, it is desirable to provide a means to generate digital signatures that are not specific to an application, such as an email client. The digital signature service also provides the functionality to obtain certificates, manage private—public keys, and generate digital signatures for documents that may be stored independent of other tools used by the user.

SUMMARY OF THE INVENTION

A digital signature service generates digital signatures for documents independent of the program used to transmit the documents. Through use of the digital signature service, a user may store the document, and corresponding digital signature, in a persistent datastore, and subsequently verify the integrity of the document and authenticity of the digital signatory. Thus, the ability to verify and authenticate a document is not dependent upon any particular application program, such as an e-mail program.

In one embodiment, the digital signature service imports a certificate for a user. To digitally sign a document, the user identifies a document for signing, and the digital signature service generates a digital signature for the document. The digital signature comprises a message digest that defines a unique fingerprint of the document. In one embodiment, the digital signature service generates a single signature file that includes the user's certificate, the document, and the digital signature. In one embodiment, the certificate, document, and digital signature are written to the signature file as a serialized object. With the signature file, the user may now store and/or transmit the document using any program for storing and transmitting files, while maintaining the integrity and authenticity capabilities associated with digital signatures. If the user transmits the signature file to a recipient, the recipient utilizes the digital signature service to verify that the document is unaltered from the original contents. The user also uses the digital signature service to authenticate, from the certificate, the digital signatory.

The digital signature service has application for use as a secure document repository. For this embodiment, a digital signature service is accessed over a network, such as through a Web Site. By accessing the Web Site, the user digitally signs documents. In one embodiment, the digital signature service imports a certificate for the user into the digital signature service. The certificate is obtained through a certificate authority. A second user, which seeks access to the document, also logs onto the network (e.g., Web Site) to access the document. Through use of the digital signature service, the user verifies the integrity of the document and the authenticity of the digital signatory.

In another embodiment, the digital signature service provides for multiple digital signatories related to a single document. For this embodiment, a first user invokes the digital signature service to generate a first signature file corresponding to a document. The first signature file contains the signature, the document and the certificate of the first user. After receiving the first signature file, a second user (e.g., a party to a contract with the first user) verifies, through use of the digital signature service, that the contents of the document is not altered and authenticates, through the digital signature service, the first user as the digital signatory. If the second user wishes to digitally sign the document, (e.g., sign a contract with the first user), the second user invokes the digital signature service to generate a second signature file.

The second signature file encapsulates the first signature file and contains the digital signature of the second user. With the second signature file, the authentication and verification of the original document is maintained, and the digital signature of the second user is appended. Similarly, any number of digital signatories may be added to a document. In another embodiment, a user accesses the digital signature service through a Web Site over the Internet. After generating a digital signature through use of the digital signature service, the user transmits the signature file to a recipient. The recipient also uses the digital signature service to verify that the user digitally signed the document and to authenticate the contents of the document. The user may also download the digital signature service to a computer device, for operation as a client application on the user's computer.

DETAILED DESCRIPTION

Figure 1:
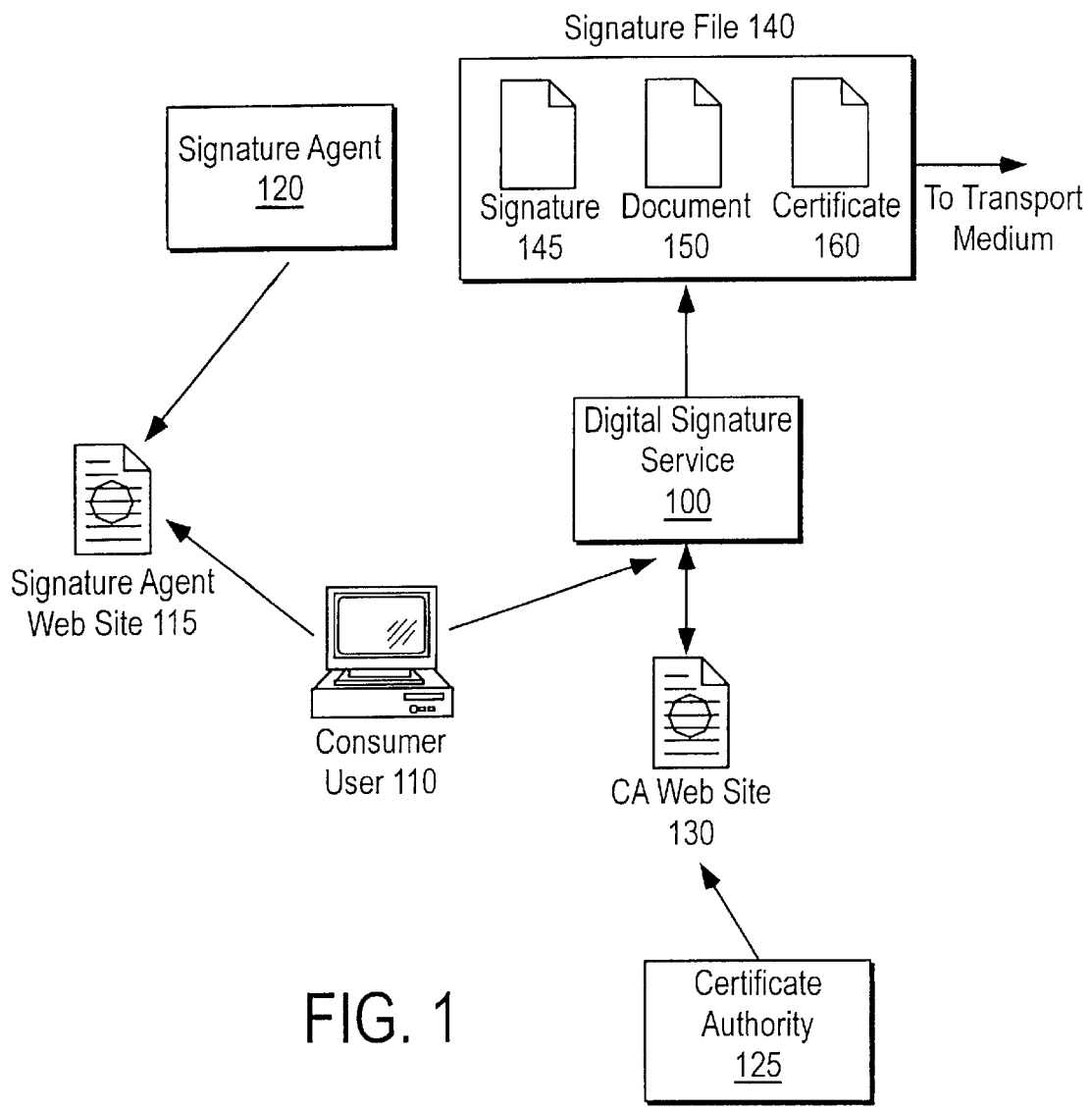
FIG. 1 illustrates one embodiment for use of the digital signature service of the present invention.

Digital Signature Service Overview:

In general, the digital signature service of the present invention generates digital signatures for documents independent of other application programs, such as e-mail programs. The digital signature service may operate as a client application program on a user's computer, or may operate as a server application, over a network. FIG. 1 illustrates one embodiment for use of the digital signature service of the present invention. For the embodiment of the FIG. 1, the digital signature service 100 runs as a client application on a computer 110. In one embodiment for the client application environment, the computer 110 downloads the digital signature service 100 from a signature agent 120 via a signature agent Web Site 115. In one embodiment, the digital signature service 100 operates to generate a predetermined number of digital signatures for a user. Thereafter, the user of computer 110 conducts a transaction with the signature agent 120 to enable the computer user 110 to generate additional digital signatures with the digital signature service 100. Although FIG. 1 shows downloading the digital signature service 100 to the computer 110 via a WebSite 115, any means of installing the digital signature service 100 on the computer 110 may be used without deviating from the spirit or scope of the invention.

The digital signature service 100 generates a signature file 140. For this embodiment, the signature file 140 includes a signature 145, a document 150, and a certificate 160, and additional attributes (not shown). As used herein, the term "document" generally refers to any file, message, or content of any type that the user wishes to digitally sign. The signature 145 is the encrypted fingerprint or message digest of the document 150. For this embodiment, the digital signature service 100 obtains the certificate 160 from a certificate authority 125. Specifically, the digital signature service 100 obtains the certificate, specific to a user, via a Certificate Authority ("CA") based on information provided by the user. The process of obtaining a certificate, via the digital signature service 100, is described more fully below. As shown in FIG. 1, the signature file 140 may be transported to another computer device via any transport medium. For example, the signature file may be transported via electronic mail (e-mail) to another computer device.

Figure 2:
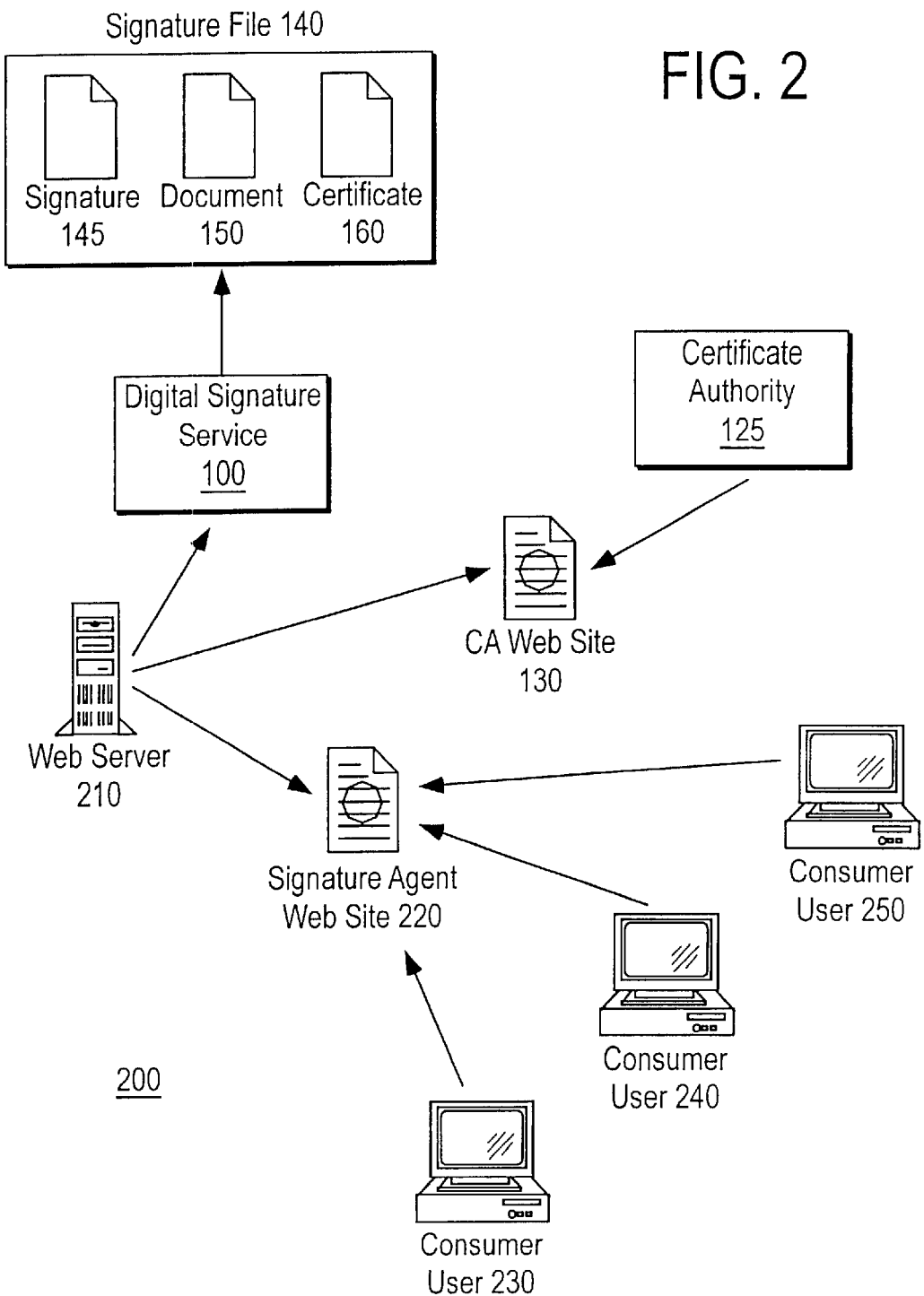
FIG. 2 illustrates one embodiment for using the digital signature service in a network environment.

FIG. 2 illustrates one embodiment for using the digital signature service in a network environment. For this embodiment, the digital signature service 100 operates on one or more computers, depicted as web server 210 in FIG. 2. In general, the signature agent, which consists of the signature file 140, digital signature service 100, web server 210, and signature agent web site 220, operates as a repository for digitally signed documents. For each document, a signature file 140, which contains the signature 145, document 150, and certificate 160, is generated via the digital signature service 100. The documents are accessible by one or more computer users. For example, as shown in FIG. 2, computer user 230, computer user 240 and computer user 250 access documents at the signature agent 120 via the signature agent web site 220. Any number of computer users may access the signature agent to view the documents 150. In one embodiment, the digital signature service 100, via the Internet, obtains a certificate for a computer user from a certificate authority 125 via the certificate authority Web Site 130. For example, the certificate authority 125 may be the companies, Digital Signature Trust, Verisign, Entrust, or any other company that acts as an independent third party.

To use the network system, the users register with the signature agent 120. For example, the user may provide certain information at the request of the signature agent. In operation, after a document is stored at the signature agent 120, a user, through the digital signature service 100, digitally signs the document using their own certificate. The digital signature service 100 digitally signs the document 150 to generate the signature 145. Thereafter, a second user, such as computer user 240, may log into the signature agent 120 via the signature agent WebSite 220. To read the digitally signed document, the computer user 240 verifies the signature and authenticates the certificate via the digital signature service 100. Thus, the computer user 240, the second computer user, has access to a secured document, and through use of the digital signature service 100, verifies both the contents of the document 150 and the certificate 160, from the signature 145, and the authenticity of its origin through the certificate 160. Similarly, any number of authorized users may log into the signature agent 120 to view the document 150. Accordingly, the digital signature service 100 has use in implementing a secure document repository system. The digital signature service 100, operating as a web based server application, permits implementation of a secured document repository system.

The FIG. 2 network embodiment may be used by distributed organizations that desire to have a central location for collaboration of documents across geographic disparate locations. For example, Company A and Company Z may wish to have a location on the web in order to collaborate on a joint project involving planning documents. If Company A has a plan for a new product that Company Z will produce, then Company A simply digitally signs the planning documents, and uploads the documents to the document repository WebSite. With this technique, Company Z extracts the document from the document repository, and verifies that the integrity of the document remains in tact. To sign off on the plans, Company Z digitally signs the document, through use of the digital signature service 100, and uploads the documents to the document repository Web Site. Now Company A may review and approve the changes made by Company Z. One skilled in the art of work group procedures will realize the great benefit provided by such a centralized Internet based document repository system.

Figure 3:
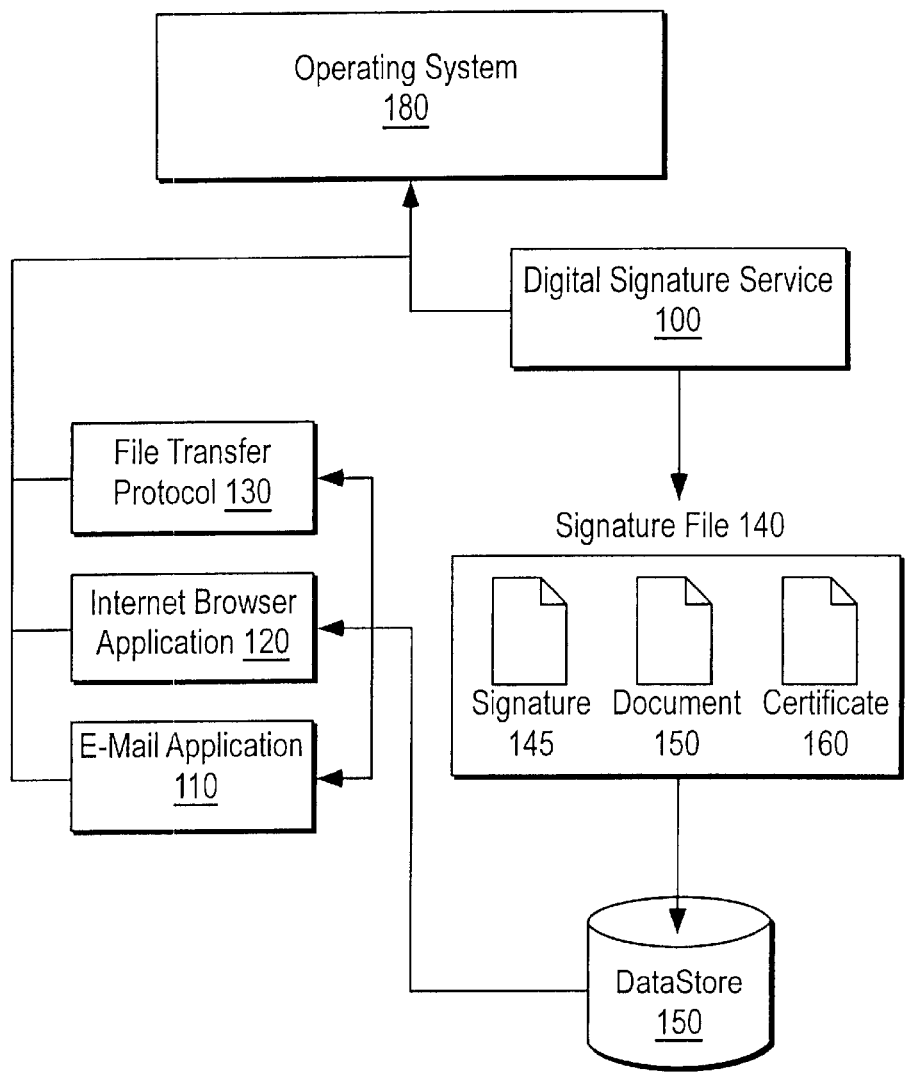
FIG. 3 is a block diagram illustrating one embodiment for operating the digital signature service with other software.

The digital signature service 100 operates independently from other applications running on a computer. FIG. 3 is a block diagram illustrating one embodiment for operating the digital signature service with other software. For this embodiment, a computer includes an operating system 180. In addition, running as applications on the computer are file transfer protocol 130, Internet browser application 120, and email application 110. In the prior art, these applications may include the ability to generate digital signatures within the application environment. For example, the email application 110 may include the ability to sign an attached document along with the message body of the email. For the embodiment shown in FIG. 3, the transmit applications (e.g., email application 110, file transfer protocol 130, and Internet browser application 120), use the single independent application, digital signature service 100, to digitally sign documents. Specifically, the applications read the signature file 140 from a persistent datastore 150.

As shown in FIG. 3, the digital signature service 100 generates the signature file 140. The signature file 140 includes a document(s) 150, certificate 160, and signature 145. The signature file 140, and its constituent parts, is stored in a persistent datastore, shown as datastore 150 in FIG. 3. For example, datastore 150 may be a hard drive or floppy drive of a computer or server. Regardless of how the signature file 145 is stored, the transmit applications (e.g., email application 110, file transfer protocol 130, and Internet browser application 120), access the signature file 145 on the datastore 150. Thereafter, the transmit applications transmit the signature file to a destination computer device. For example, email application 110 may transmit, as in attachment to an email, the signature file 140 to a destination computer device. At a receiving computer device, a user may retrieve the signature file 140 through use of an email application program. Thereafter, the signature file 140 may be stored in a persistent datastore at the receiving computer device. For example, after retrieving the signature file with the email program, a user may store the signature file 140, including the document 150, for subsequent verification using the digital signature service. Thus, the independent digital signature service 100 permits storing the signed document independent of the transport application (i.e., email application).

Figure 4:
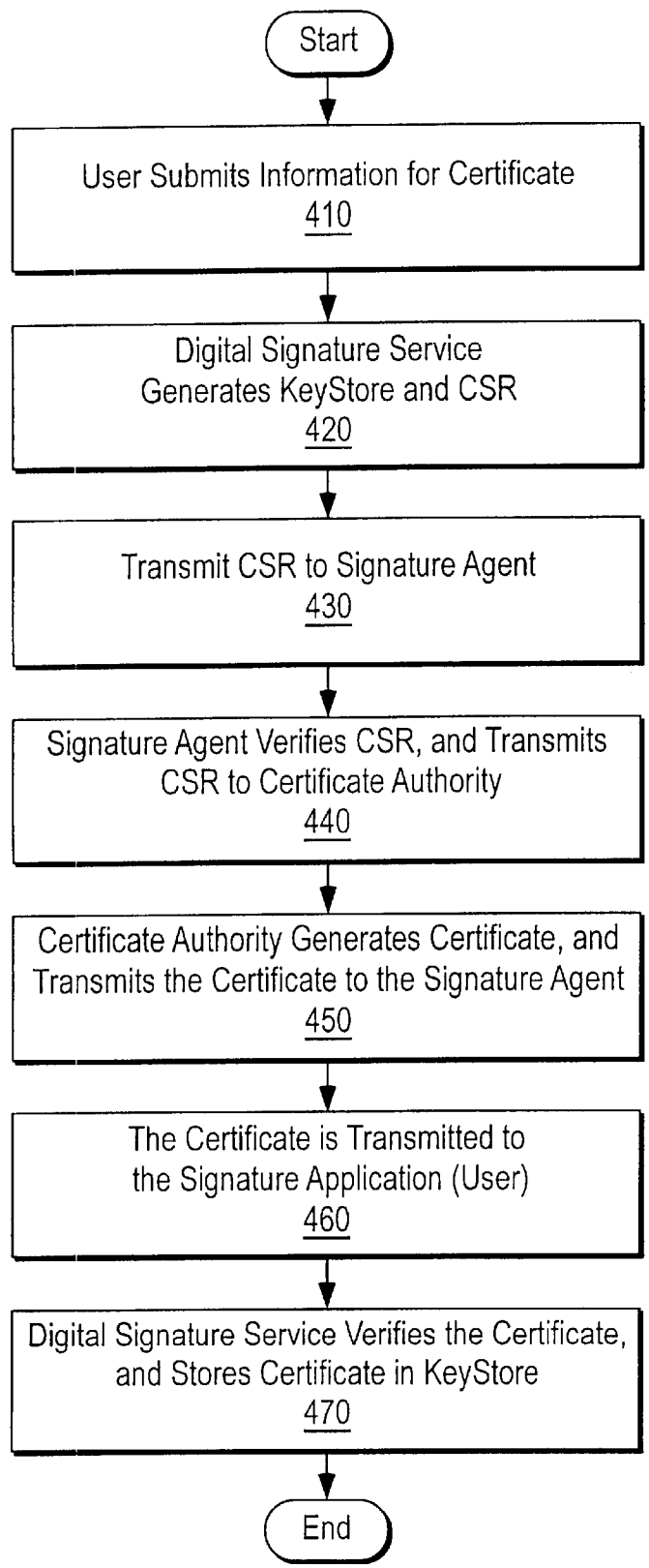
FIG. 4 is a flow diagram illustrating one embodiment for obtaining a certificate through use of the digital signature service of the present invention.

Obtaining a Certificate Through the Digital Signature Service:

The first step for a user to create digital signatures is to obtain a certificate. FIG. 4 is a flow diagram illustrating one embodiment for obtaining a certificate through use of the digital signature service of the present invention. First, the user submits identifying information that is used to generate the actual certificate (block 410, FIG. 4). In one embodiment, the digital signature service prompts the user to fill in fields displayed on the computer output display. Once this information: is entered, the digital signature service saves the information to file. When the customer receives their certificate, this information is extracted to confirm that the certificate received is valid.

The digital signature service generates a certificate request ("CSR") (block 420, FIG. 4). The CSR requires the public key of the key pair. The key pair consists of a private key and a public key. The private key is used to sign the documents, and the public key is used to obtain the certificate for the user and to decrypt the message digest's that were encrypted with the user's private key. Because the private key and the public key are related, and the public key is generated for the CSR, the private key is generated at this time. In one embodiment the CSR is stored to a file so that the user may send it to obtain a certificate. For this embodiment, a private key is generated, encrypted and temporarily written to file.

In one embodiment, to generate the key pair, a secure random number generator and a random seed are used. This technique eliminates duplicating a key pair. In one embodiment, the secure random number generator is implemented through a JAVA application programming interface ("API"). The random seed, a pseudo-random number, is generated through the timing of user key presses. For this embodiment, the user is prompted to start typing on the keys of the keyboard. While the user types these keys, the digital signature service 100 utilizes the timing of the key presses to generate a number. When this process obtains a number of the desired size, the number is passed to the secure random number generator to produce a number that is, in turn, used as a seed for the generation of the key pair.

The private key is stored using a passphrase. When storing a private key in Java's KeyStore Object, the private key is encrypted using the user's passphrase. A passphrase is used to check the integrity of the keystore itself. Also, when the user attempts to retrieve the key from the keystore, a passphrase is used to maintain the integrity of the private key. Specifically, an initial message digest of the keystore is formed and encrypted with the user's passphrase. If the correct passphrase is not provided, then the message digest of the keystore will not correctly decrypt, and the message digest of the keystore will not validate, much like a digital signature. When a second message digest is created against the keystore, it is compared with the initial decrypted message digest. If the two message digests do not match, because the passphrase was incorrect or the keystore was modified, then the keystore is invalid.

In one embodiment, a second passphrase is used for encrypting the private key, before storing it in the keystore, and for decrypting the private key when retrieving it from the keystore. If an incorrect passphrase is provided, then the private key is not properly decrypted. This invalid private key, if used to generate a digital signature, will not permit a recipient of the digital signature to verify the signature with the recipient's public key contained in the certificate. Accordingly, through use of the second passphrase, the digital signature service 100 protects the private key from unauthorized use. In one embodiment, the same passphrases are used for the two above identified functions to simply use of the digital signature service.

Once the CSR has been created, it is transmitted to the signature agent 120 (block 430, FIG. 4). At the signature agent, a check for the validity of the CSR is made by evaluating the attributes of the CSR. The attributes contain the information used to generate the actual certificate. Specifically, at the signature agent 120, a search is conducted, through use of a database, to verify that the user has registered with the signature agent prior to obtaining the certificate from the certificate authority. In another embodiment, to obtain additional verification, email is sent to the user's email address, and the user is requested to respond via a specific web page or another email. After the signature agent verifies the CSR, the CSR is sent to the certificate authority based on the information contained in the CSR (block 440, FIG. 4).

Once the certificate has been created, the certificate authority transmits the certificate to the signature agent (block 450, FIG. 4). In one embodiment, the certificate authority transmits the certificate in a DER format, so that it may be distributed to the user via email. When the user receives the certificate at their computer, it is saved to file, and the digital signature service is launched (block 460, FIG. 4).

Once the user obtains the certificate and launches the digital signature service, the keystore is created and the private key and certificate are stored in Java's KeyStore object (block 465, FIG. 4). The temporary file, containing the encrypted private key, is deleted. In alternative embodiments, different key storage facilities may be used, and the process of storing the private key in a temporarily file, prior to obtaining the certificate, may be replaced by generating the keystore at the time the private key is generated.

The user attempts to import the certificate into the digital signature service. During this process, the identity of the certificate is confirmed before adding it to the key store (block 470, FIG. 4). If the information matches the information provided for the CSR, then the digital signature service 100 adds the certificate to the key store database on the user's computer.

Signing a File with the Digital Signature Service:

The digital signature service 100 automates the procedure for digitally signing documents. In one embodiment, to sign a document, the user launches the digital signature service, either remotely (i.e., through the embodiment of FIG. 2) or as a client application (i.e., through the embodiment of FIG. 1), and selects a file to sign. As discussed above, after creating the signature file, the file may be sent to a recipient by any means.

Figure 5:
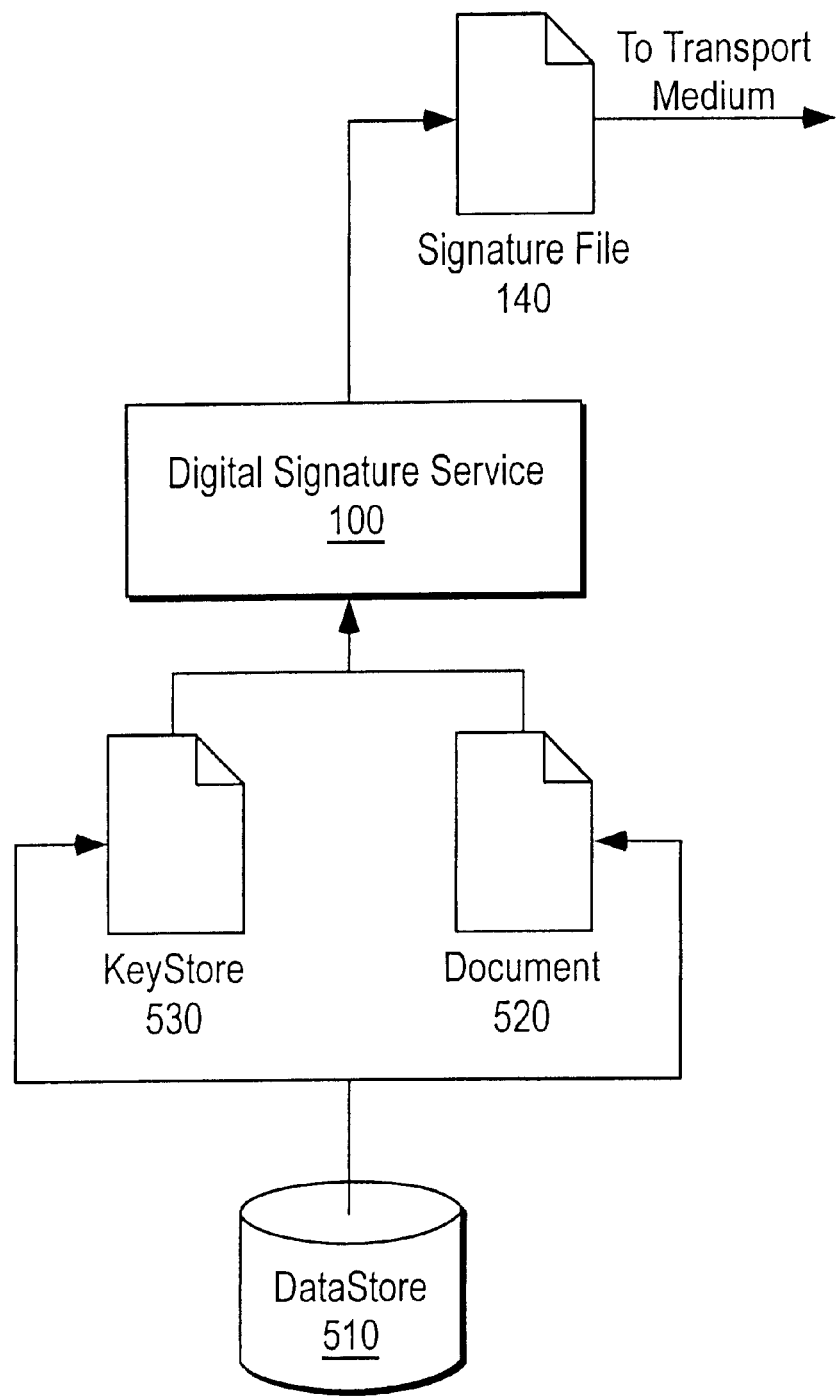
FIG. 5 is a block diagram illustrating the process of digitally signing a document through use of the digital signature service of the present invention.

FIG. 5 is a block diagram illustrating the process of digitally signing a document through use of the digital signature service of the present invention. A data store, a persistent mechanism, stores the document 520 (the document for digital signing) along with the key store 530. The digital signature service 100 retrieves the document and keystore from the datastore 510 to generate the signature file 140. The signature file 140 is now available for transmission through any medium.

Figure 6:
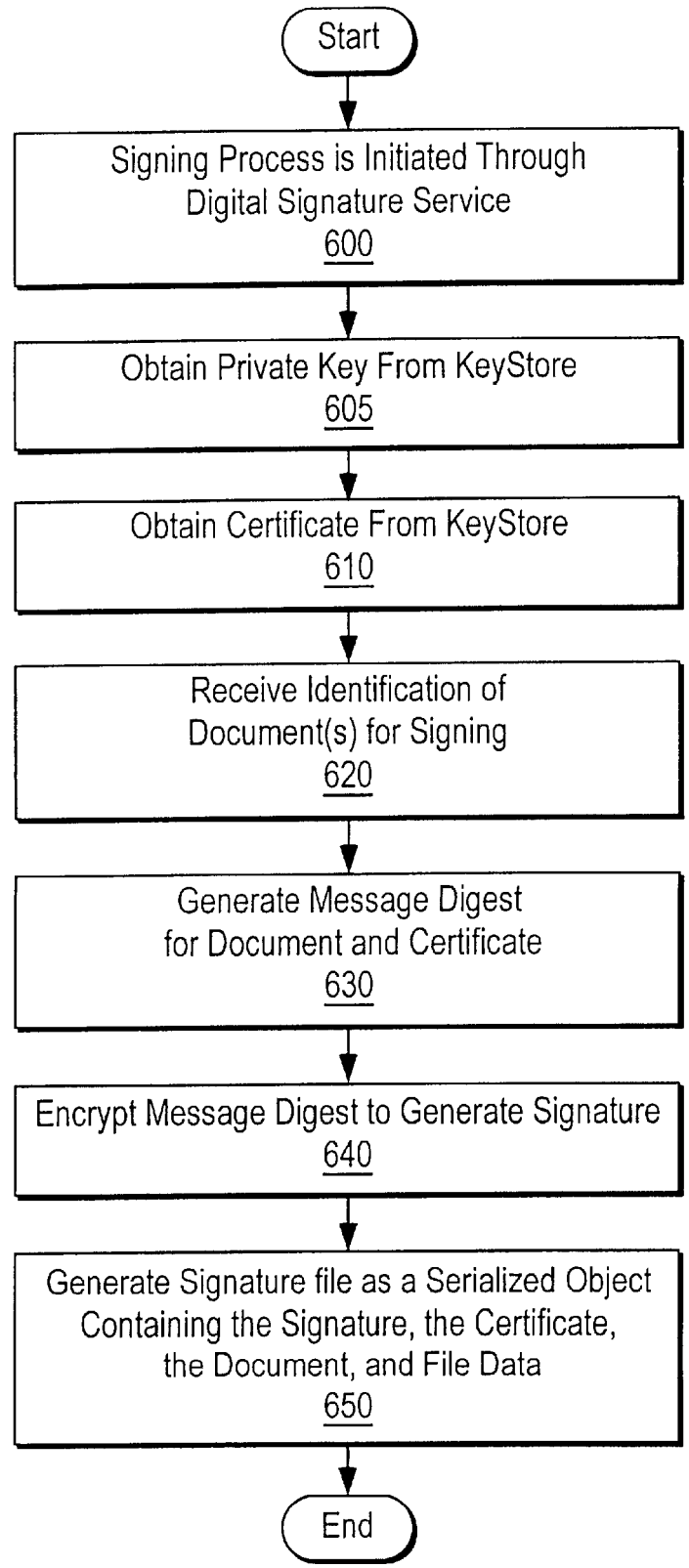
FIG. 6 is a flow diagram illustrating one embodiment for generating a digital signature for a document through use of the digital signature service.

FIG. 6 is a flow diagram illustrating one embodiment for generating a digital signature for a document through use of the digital signature service. The signing process is initiated through invoking the digital signature service 100, as either a server application (FIG. 2) or a client application (FIG. 1) (block 600, FIG. 6). First, to create the digital signature, the private key is retrieved from the data store (block 605, FIG. 6). To obtain the private key from the key store, the user must know the pass phrase that was used when the private key was stored. Without this pass phrase, a private key cannot be retrieved from the data store. This feature provides an additional layer of security through use of the key store faculty. The certificate is then retrieved from the key store (block 610, FIG. 6). In one embodiment, this process is similar to the process used to retrieve the private key. Also, if the key store is corrupted, the digital signature service detects this, and generates an error.

To generate the signature itself, the user identifies the documents for signing (block 620, FIG. 6). The digital signature service generates a message digest for the document (block 630, FIG. 6). As is well-known in the art, the message digest is a unique fingerprint of the document contents. Any well-known technique for generating message digests may be use by the digital signature service. In one embodiment, the "SHA-1" algorithm is used to generate the message digest. However, any algorithm for generating a message digest, including MD5, etc., may be used without deviating from the spirit and scope of the invention.

To generate the signature, the message digest is encrypted using the private key (block 640, FIG. 6). In one embodiment, the JAVA Developers Kit ("JDK") 1.2, available from Sun Microsystems, provides the necessary functionality to generate a signature without significant programming on behalf of the developer. Specifically, in one embodiment, the signature is generated via a signed object class. Any algorithm for encrypting the message digest may be used. In one embodiment, the Digital Signature Algorithm ("DSA") is used to encrypt the message digest. In alternative embodiments, other algorithms, such as DSA, RSA, DES, Triple DES, elliptic curve, etc., may be used.

Once the signature is generated, the digital signature service generates the signature file, as a serialized object (block 650, FIG. 6). The signature file contains the signature, the certificate, the document, and, optionally, additional file attributes. The additional file attributes may include a file date, a string file name, and the number of times the file has been signed (i.e., multiple signature attribute). In one embodiment, the multiple signature attribute is used to automate the process for multiple signatures (See FIG. 9). Specifically, the multiple signature attribute allows the digital signature service to track the number of signatures on the current signature file. This tracking permits the digital signature service to display the appropriate Certificates to the user and to extract the original document. Additional file attributes may be added to the digital signature file.

By writing both the signed object and certificate to a file as serialized objects, at least two benefits are obtained. First, this process simplifies the verification process on the server by combining all the information in a single signature file. Second, the use of serialized objects provides additional security. Since the information is written to a file as serialized objects, an attempt to intercept the file to replace it with extraneous data would be difficult because the intruder would have to extract the information in exactly the same fashion as it was written to file. Accordingly, this technique minimizes the ability to tamper with the signature file.

Once the signature file has been created, the user of the digital signature service may use any means available to send a file to a recipient as shown in FIG. 1. Alternatively, the file may be a loaded to a Web server to implement the central repository embodiment shown in FIG. 2.

Figure 7:
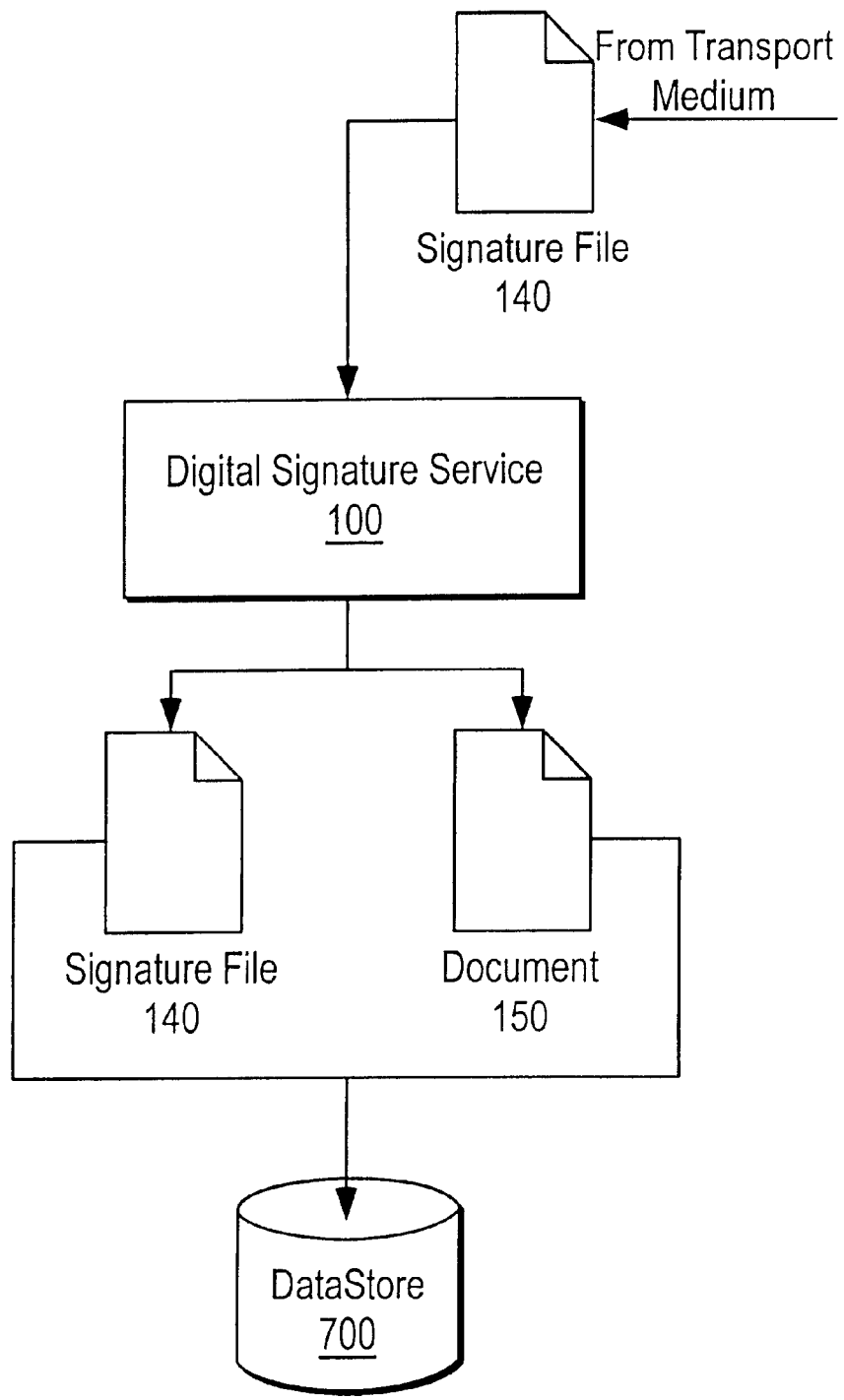
FIG. 7 is a block diagram illustrating one embodiment for verification of a digital signature with the digital signature service of the present invention.

Document Verification with the Digital Signature Service:

FIG. 7 is a block diagram illustrating one embodiment for verification of a digital signature with the digital signature service of the present invention. The digital signature service has the ability to verify a signature. As shown in FIG. 7, the signature file 140 enters the user's computer from any transport mechanism (email, FTP, or transport across a network through file sharing, etc.). The digital signature service 100 verifies the integrity of the document through use of the signature as described below in conjunction with FIG. 8. If the document is verified through the digital signature, the document, and the signature file are stored in a persistent data store, such as data store 700.

Figure 8:
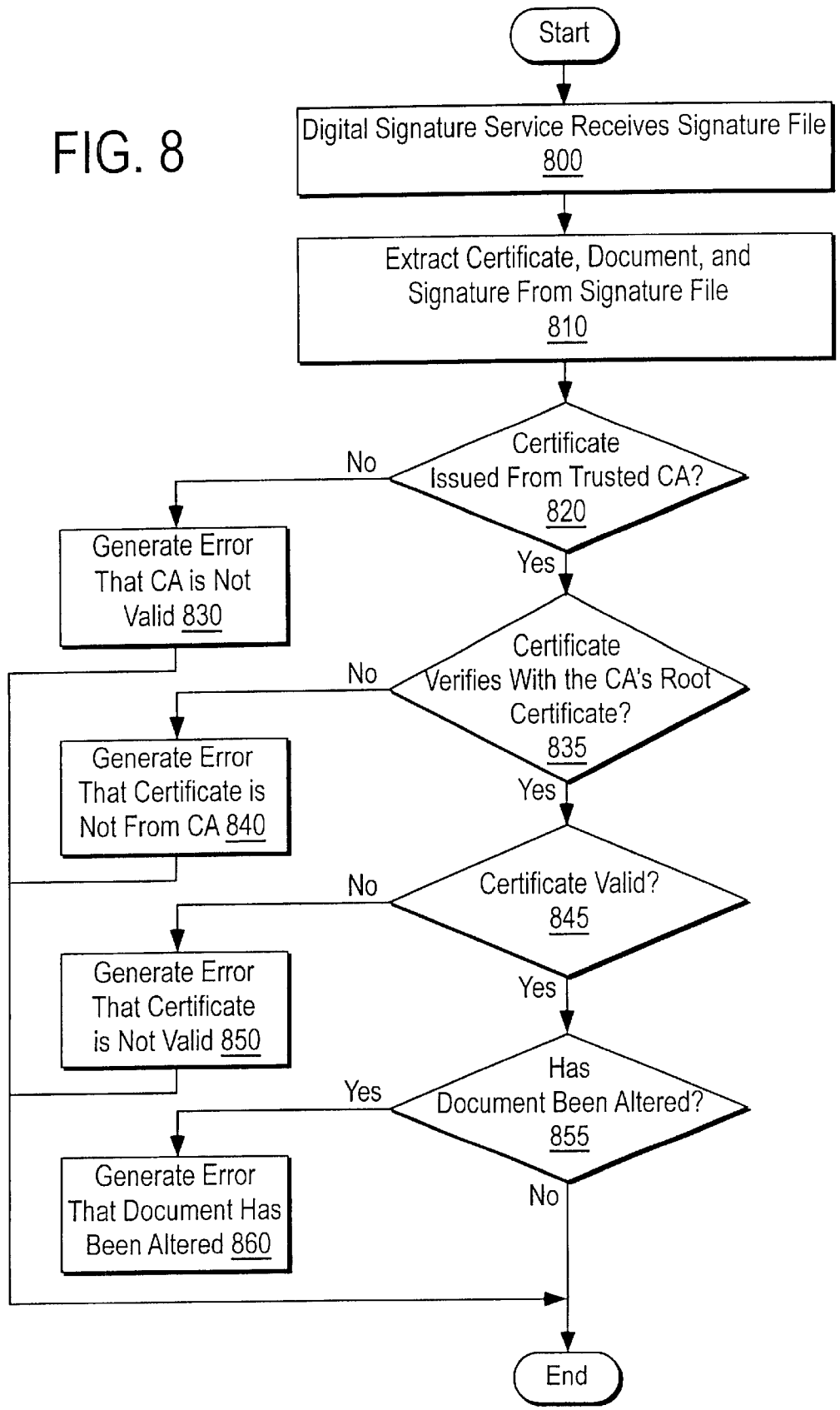
FIG. 8 is a flow diagram illustrating one embodiment for verifying a digital signature using the digital signature service.

FIG. 8 is a flow diagram illustrating one embodiment for verifying a digital signature using the digital signature service. The digital signature service 100 receives the signature file (block 800, FIG. 8). The certificate, document, and signature are extracted from the signature file (block 810, FIG. 8). In one embodiment, the digital signature service verifies that the signature is from a trusted certificate authority (block 820, FIG. 8). This eliminates the possibility of unauthorized certificates entering the system. Specifically, the information in the issuer attribute is compared with the information from a list of trusted certificate authorities. If the certificate is not from a trusted certificate authority, then the process is stopped, and an error is reported (block 830, FIG. 8).

Once the certificate is verified as being from a trusted certificate authority, then the validity of the certificate, using the certificate authority's root certificate, is checked (block 835, FIG. 8). This process allows the digital signature service to determine if the signature is truly from the certificate authority listed in the "issuers attribute." To accomplish this, a message digest of the customer's certificate is generated. Then, the message digest contained in the certificate, which was encrypted by the certificate authority's private key, is extracted. The message digest, contained in the customer's certificate, is decrypted using the public key contained in the certificate authority's root certificate. If the customer's certificate cannot be verified using the certificate authority's root certificate, then the verification process is stopped, and an error is reported (block 840, FIG. 8).

The digital signature service then determines whether the certificate is valid for the customer (block 845, FIG. 8). Certificates expire, and certificate authority's revoke them. To check for a valid certificate, the digital signature service 100 determines whether the date range is valid at the time the message is received. The date range is a start and end date that is obtained from the certificate. If the certificate is not valid, then the process is stopped and an error is reported (block 850, FIG. 8). Also, to validate the certificate, a C. R. L. check is executed to insure that the certificate has not been revoked. Specifically, an iterative search through the C. R. L. is performed. If the certificate fails the C. R. L., then the process is halted, and an error is reported.

The next step in the process is to determine whether the document received has been altered (block 855, FIG. 8). The signature is decrypted with the public key, stored as part of the certificate. The decrypted signature yields the message digest. The message digest is then used to determine whether the document has been altered. If it has, then an error is generated, and the process is terminated (block 860, FIG. 8). Also, if the message digest cannot be properly decrypted using the certificate's public key, then the signature or the certificate does not belong to the customer. If this is the case, then either the certificate or signature has been replaced or altered in transit. Regardless, under this scenario, the integrity of the data has been compromised, and the process is halted, and an error is reported. If the certificate's public key successfully decrypted the signature, then the message digest from the signature is compared to the message digest independently generated by the digital signature service. If they match, then the integrity of the document and certificate have been maintained. At this stage, the verification process is complete, and a recipient may process the document in any manner. However, if the message digests do not match, then the message that was sent by the customer has changed in transit and is no longer valid. In this case, the process is halted, and an error is generated.

Figure 9:
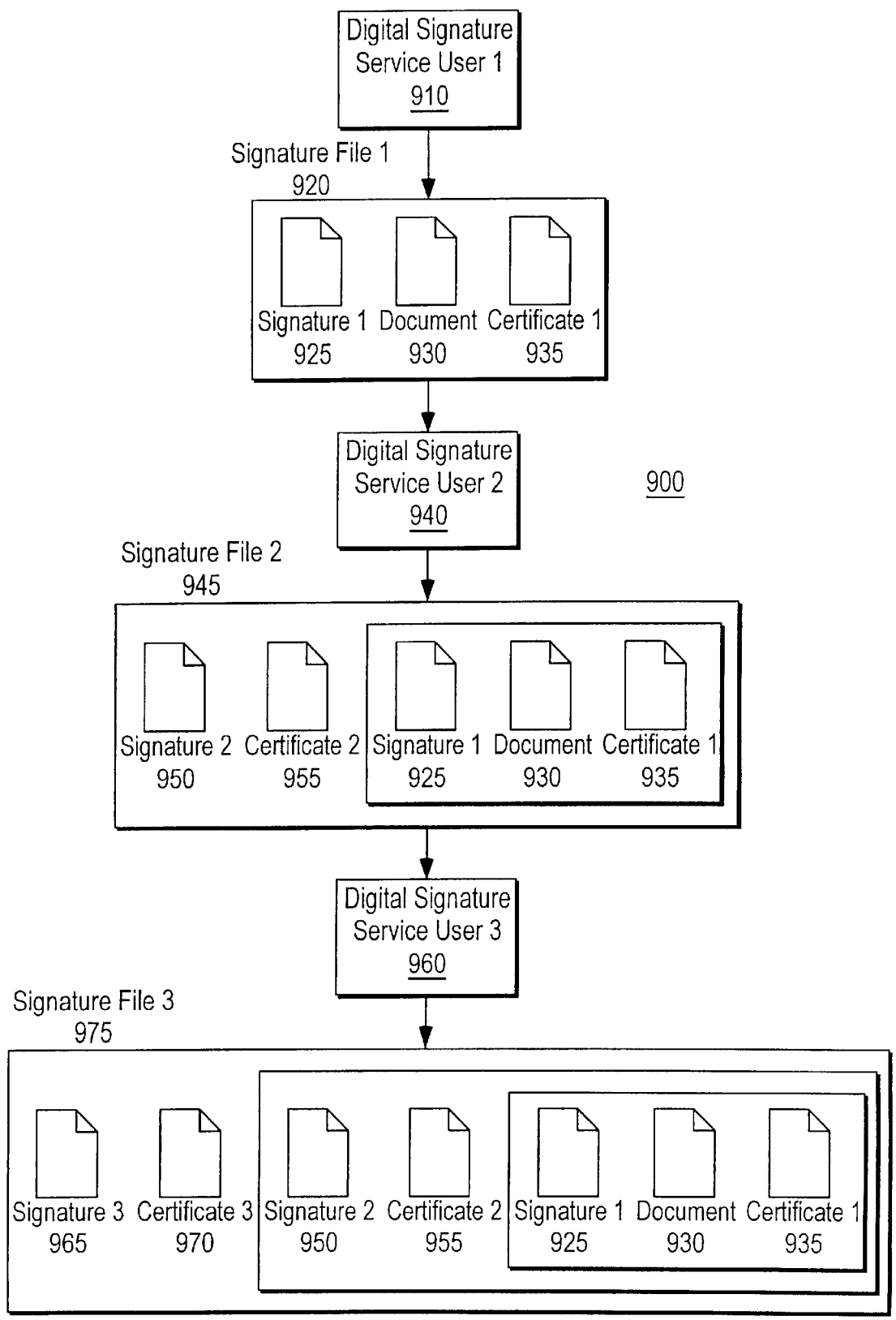
FIG. 9 is a block diagram illustrating one embodiment for implementing multiple signatures through the digital signature service.

Multiple Parties Using Digital Signatures:

The digital signature service of the present invention has application for use with multiple users that digitally sign a document. FIG. 9 is a block diagram illustrating one embodiment for implementing multiple signatures through the digital signature service. For this example, three parties wish to become signatories to a single document, document 930. A first party, designated user 1, obtains a certificate, labeled certificate "1" 935 on FIG. 9. User 1 wants to authenticate and secure, through a digital signature, document 930. To this end, user 1 utilizes digital signature service 910 to digitally sign document 930 to generate signature 925. The three documents, along with any additional file data, constitute signature file "1" 920. At this stage, user 1 may transport signature file "1" 920 to user 2 through any means (e.g., email).

After receiving signature file 920, user 2, through the digital signature service 940, verifies the authenticity of user 1 as well as the contents of the document 930 and certificate "1" 935. If the verification is complete, and user 2 wishes to become a signatory to document 930, then user 2, through the digital signature service 940, signs the entire signature file I, with user 2's certificate "2" 955 to generate signature "2" 950. Again, the entire contents, including the encapsulated signature file "1" 920, certificate "2" 955, and signature "2" 950 comprise signature file 2, along with any additional file data. Note that the entire signature file "1" 920 remains in tact, and user 2, through the digital signature service, encapsulates and signs the entire signature file 920. User 2 may transport signature file "2" 945 by any means to a third party, user 3.

For this example, user 3 also wishes to become a signatory to document 930 along with user 1 and user 2. To this end, user 3, through digital signature service 960, verifies the authenticity of user 2, with certificate "2" 955 and signature "2" 950, and also verifies the authenticity of user 1, with certificate "1" 955 and signature "1" 925. In addition, user 3, through use of the digital signature service 960, verifies the contents of document 930 with signature "1" 925. If user 3 wishes to become a signatory to document 930, then user 3, using the digital signature service, signs the encapsulated signature file "2" 945 with user 3's certificate 970 to generate signature "3" 965. Again, for this embodiment, the entire contents are encapsulated in a signature file "3" 975 for transmission to user 1 and user 2. User 1 and user 2 may wish to retain the signed documents for their records.

The example of FIG. 9 illustrates the use of the digital signature service for multiple signatories to a single document. Any number of user's signatories may participant using the digital signature service. Also, the digital signature service may be launched as a client application on each user's computer device (See FIG. 2) or may be launched remotely from the users, such as through a Web Server hosting a Web Site (See FIG. 1).

The digital signature service may be used to enter into legally binding contracts between two or more parties. The certificates (e.g., X.509 ISO standard) authenticate that the signor is who they purport to be, and the signature is secured through encryption of the message digest. Accordingly, security of the file is provided through the encrypted signature, and authenticity of the user is provided through the certificate.

The digital signature service also has application for use in document version control among multiple parties. For example, the digital signature service may be used to negotiate a contract among multiple parties. For example, as described above in conjunction with FIG. 9, Party A may prepare version 1 of a contract, digitally sign the contract, and send the signature file to Party B. Party B reviews version 1 of the contract, and revises it into contract version 2. Party B, using the digital signature service, signs contract version 2, and sends the new signature file to Party A (e.g., emails the signature file). If Party A agrees with the revisions, Party A signs the signature file of the contract version 2, retains a copy for his/her records, and transmits to Party B the signed signature file. The signature file contains contract version 2, Party B's signature of contract version 2 and Party B's certificate, as well as Party A's signature to the encapsulated signature file from Party B. Party B then retains a copy of the new signature file for his/her records. Similarly, this process may incorporate multiple parties as shown in the example of FIG. 9. Accordingly, the digital signature service has application for use as a contract or document control and security mechanism.

Figure 10:
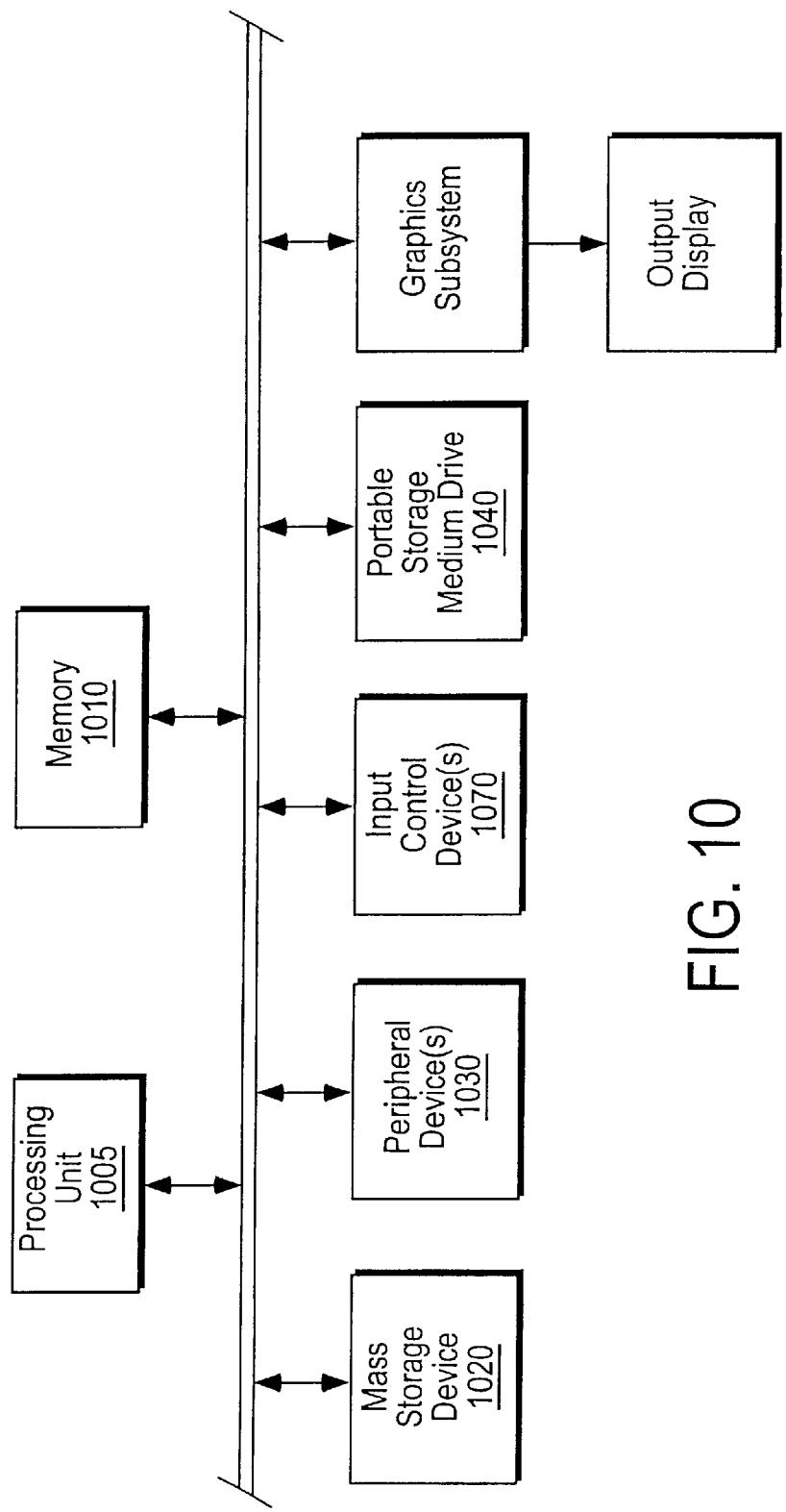
FIG. 10 illustrates a high-level block diagram of a general-purpose computer system for running the digital signature service.

Computer System:

FIG. 10 illustrates a high level block diagram of a general purpose computer system for which the digital signature service may operate. A computer system 1000 contains a processor unit 1005, main memory 1010, and an interconnect: bus 1025. The processor unit 1005 may contain a single microprocessor, or may contain a plurality of microprocessors for configuring the computer system 1000 as a multi-processor system. The main memory 1010 stores, in part, instructions and data for execution by the processor unit 1005. If the digital signature service system of the present invention is implemented in software, the main memory 1010 stores the executable code when in operation. The main memory 1010 may include banks of dynamic random access memory (DRAM) as well as high speed cache memory.

The computer system 1000 further includes a mass storage device 1020, peripheral device(s) 1030, portable storage medium drive(s) 1040, input control device(s) 1070, a graphics subsystem 1050, and an output display 1060. For purposes of simplicity, all components in the computer system 1000 are shown in FIG. 10 as being connected via the bus 1025. However, the computer system 1000 may be connected through one or more data transport means. For example, the processor unit 1005 and the main memory 1010 may be connected via a local microprocessor bus, and the mass storage device 1020, peripheral device(s) 1030, portable storage medium drive(s) 1040, graphics subsystem 1050 may be connected via one or more input/output (I/O) busses. The mass storage device 1020, which may be implemented with a magnetic disk drive or an optical disk drive, is a non-volatile storage device for storing data and instructions for use by the processor unit 1005. In the software embodiment, the mass storage device 1020 stores the digital signature service system software for loading to the main memory 1010.

The portable storage medium drive 1040 operates in conjunction with a portable non-volatile storage medium, such as a floppy disk or a compact disc read only memory (CD-ROM), to input and output data and code to and from the computer system 1000. In one embodiment, the digital signature service system software is stored on such a portable medium, and is input to the computer system 1000 via the portable storage medium drive 1040. The peripheral device(s) 1030 may include any type of computer support device, such as an input/output (I/O) interface, to add additional functionality to the computer system 1000. For example, the peripheral device(s) 1030 may include a network interface card for interfacing the computer system 1000 to a network.

The input control device(s) 1070 provide a portion of the user interface for a user of the computer system 1000. The input control device(s) 1070 may include an alphanumeric keypad for inputting alphanumeric and other key information, a cursor control device, such as a mouse, a trackball, stylus, or cursor direction keys. In order to display textual and graphical information, the computer system 1000 contains the graphics subsystem 1050 and the output display 1060. The output display 1060 may include a cathode ray tube (CRT) display or liquid crystal display (LCD). The graphics subsystem 1050 receives textual and graphical information, and processes the information for output to the output display 1060. The components contained in the computer system 1000 are those typically found in general purpose computer systems, and in fact, these components are intended to represent a broad category of such computer components that are well known in the art. In addition, the digital signature service may be implemented on a main frame system, and communicate to a user at a terminal unit. Also, the user may operate the digital signature service in a Unix environment, wherein the user's home directory and primary storage resides on another machine, although transparent to the user. Furthermore, the digital signature service may operate via a network computer, configured with minimal processing resources and memory.

The digital signature service system may be implemented in either hardware or software. For the software implementation, the digital signature service is software that includes a plurality of computer executable instructions for implementation on a general purpose computer system. Prior to loading into a general purpose computer system, the digital signature service software may reside as encoded information on a computer readable medium, such as a magnetic floppy disk, magnetic tape, and compact disc read only memory (CD-ROM). In one hardware implementation, the digital signature service system may comprise a dedicated processor including processor instructions for performing the functions described herein. Circuits may also be developed to perform the functions described herein.

Although the present invention has been described in terms of specific exemplary embodiments, it will be appreciated that various modifications and alterations might be made by those skilled in the art without departing from the spirit and scope of the invention.

What is claimed is:

1. A method for providing authenticated documents to a plurality of users over a network, said method comprising the steps of:

coupling, through a network, a computer of a first user, a computer of a second user and a server;

implementing, on a server, a digital signature service;

transmitting, over said network, a document from said computer of said first user to said digital signature service;

importing a digital certificate for said first user into said digital signature service;

generating a digital signature from said digital signature service at said server for said document and a certificate for said first user, said digital signature comprising a message digest that defines a unique fingerprint of said document;

transmitting, over said network, said document, said certificate and said signature from said digital signature service to said computer of said first user;

storing said document, said certificate and said signature at said computer of said first user;

transmitting said document, said certificate and said signature from said computer of said first user to said computer of said second user;

accessing, over said network, said digital signature service on said server from said computer of said second user;

verifying, through said digital signature service, that the original content of said document is not altered; and authenticating, through said digital signature service, that said signor of said document is valid.

2. The method as set forth in claim 1, further comprising the step of permitting, over said network, said second user to generate, through said digital signature service, a digital signature to authenticate digital signing of said document by said second user.

3. The method as set forth in claim 1, further comprising the steps of:

permitting, over said network, at least one additional user to generate, through said digital signature service, a digital signature for a modified version of said document so as to authenticate, through said digital signature, the digital signing by said additional user, and to authenticate the contents of said modified document through generation of a second message digest; and permitting at least one user, over said network, to access said digital signature service to verify, through said digital signature service, that the original content of said modified document is not unaltered, and to authenticate, through said digital signature service, that said signor of said document is valid.

4. The method as set forth in claim 1, wherein the step of offering to at least one user, over a network, a digital signature service comprises the step of offering said digital signature service through a Web Site over the Internet.

5. A method for generating digital signatures for use with documents shared between at least two parties, said method comprising the steps of:

offering, through a Web Site, a digital signature service for a first user, said digital signature service permitting said first user to select one or more documents to generate a corresponding digital signature, wherein said digital signature authenticates that said first user digitally signed said document and authenticates the contents of said document through generation of a message digest;

storing said document, certificate and said signature at a computer of said first user;

transmitting said document, certificate and said signature from said computer of said first user to a computer of a second user; and providing, to said second user, a digital signature service through a Web Site for verifying said digital signature for said document, so as to verify that said user digitally signed said document, and to authenticate the contents of said document.

6. The method as set forth in claim 5, further comprising the steps of:

obtaining a certificate, through said digital service, for said user from a certificate authority; and importing said certificate of said user into a digital signature service to generate said digital signature.

7. The method as set forth in claim 5, further comprising the step of downloading, over said public network, said digital signature service to a computer device of said first user for operation of said digital signature service as a client application on said computer device.

8. A network system for generating digital signatures, said system comprising:

a server for offering, through a Web Site, a digital signature service for a first user, said digital signature service permitting said first user to select one or more documents to generate a corresponding digital signature, wherein said digital signature authenticates that said first user digitally signed said document and authenticates the contents of said document through generation of a message digest;

computer for storing said document, certificate and said signature for said first user;

computer of a second user;

network for transmitting said document, certificate and said signature from said computer of said first user to a said computer of a said second user; and wherein said server for providing, to said second user, a digital signature service for verifying said digital signature for said document, so as to verify that said user digitally signed said document, and to authenticate the contents of said document.

9. The system as set forth in claim 8, wherein said server further for obtaining a certificate, through said digital signature service, for said user from a certificate authority and for importing said certificate of said user into a digital signature service to generate said digital signature.

10. The system as set forth in claim 8, further comprising a client application for said computer of said first user for operating said digital signature service.

11. A computer readable medium comprising a plurality of instructions, which when executed by a computer, causes the computer to perform the steps of:

offering, to a plurality of users, a digital signature service;

generating, using said digital signature service at a first user, a first signature file corresponding to at least one document, said first signature file comprising said document and a digital signature of said first user;

transferring said first signature file from said first user to a second user;

verifying, at said second user, through use of said digital signature service and said first signature file, that the contents of said document is not altered;

authenticating, at said second user, through said digital signature service, said signature of said first user with said digital signature; and generating a second signature file comprising said first signature file and a digital signature of said second user, whereby said second signature file permits authentication of said document and verification of said digital signature of said first user and verification of said digital signature of said second user.

12. A method of document verification for a plurality of users, said method comprising the steps of:

offering, to a plurality of users, a digital signature service;

generating, using said digital signature service at a first user, a first signature file corresponding to at least one document, said first signature file comprising said document and a digital signature of said first user;

transferring said first signature file from said first user to a second user;

verifying, at said second user, through use of said digital signature service and said first signature file, that the contents of said document is not altered;

authenticating, at said second user, through said digital signature service, said signature of said first user with said digital signature; and generating a second signature file comprising said first signature file and a digital signature of said second user, whereby said second signature file permits authentication of said document and verification of said digital signature of said first user and verification of said digital signature of said second user.

* * * * *